ISAAC LEHMER.

Improvement in Wind Mills.

No. 119,159.  Patented Sep. 19, 1871.

Witnesses:
P. C. Dieterich
Francis McArdle

Inventor:
Isaac Lehmer
PER Munn & Co
Attorneys.

UNITED STATES PATENT OFFICE.

ISAAC LEHMER, OF LIMA, INDIANA.

IMPROVEMENT IN WINDMILLS.

Specification forming part of Letters Patent No. 119,159, dated September 19, 1871.

*To all whom it may concern:*

Be it known that I, ISAAC LEHMER, of Lima, in the county of LaGrange and State of Indiana, have invented a new and useful Improvement in Windmills; and I do hereby declare that the following is a full, clear, and exact description thereof, which will enable others skilled in the art to make and use the same, reference being had to the accompanying drawing forming part of this specification, in which—

Figure 1:
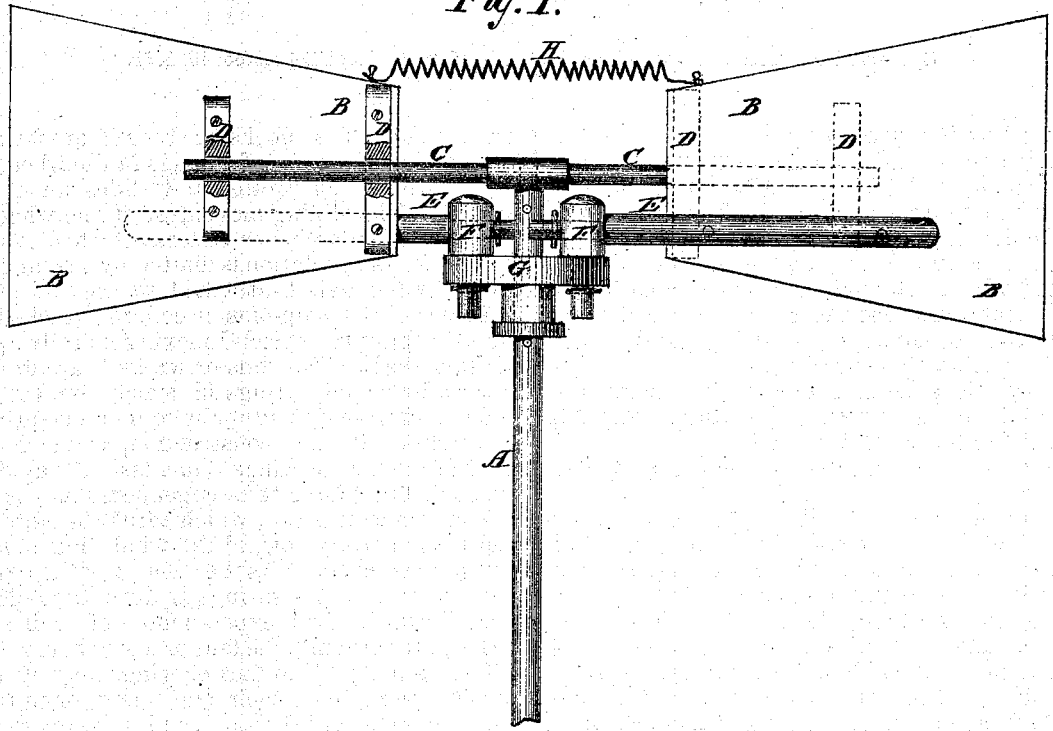
Figure 2:
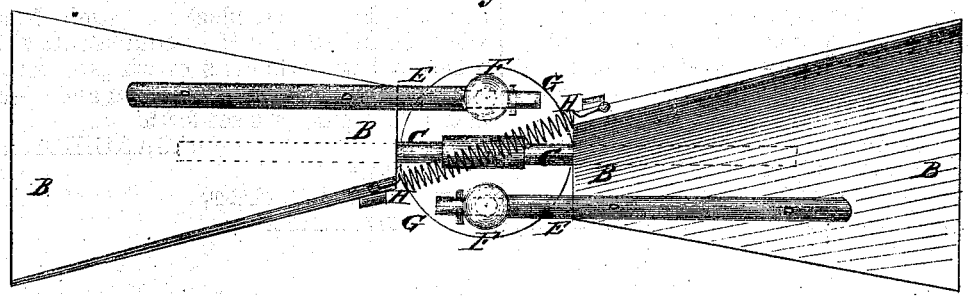

Figure 1 is a detail side view of a portion of a windmill illustrating my invention. Fig. 2 is a detail front view of the same.

Similar letters of reference indicate corresponding parts.

My invention has for its object to furnish a simple and effective means for making the fans or wings of a windmill self-adjusting, so that they will adjust themselves as the wind varies in force by turning their edges more or less to the wind, as may be required; and it consists in the construction and combination of the rods, spring, and sliding wheel with the wings or fans and the shaft, as hereinafter more fully described.

A is the horizontal shaft, with the outer end of which the fans or wings B are connected, and which is revolved by the movement of the said wings or fans B. C are rods, the inner ends of which are rigidly attached to the outer end of the shaft A, and the outer parts of which pass through keepers D attached to the fans or wings B, so that the said fans or wings B, may slide out and in upon the said rods C. To the fans or wings B, at or near their inner-side edges are securely and rigidly attached the outer parts of the rods E. Upon the inner ends of the rods E are formed journals which enter and work in bearings in the upper ends of the blocks or studs F. Upon the lower ends of the blocks or studs F are formed journals, which work in bearings in the wheel G, the hub of which rotates and slides upon the shaft A. The sliding movement of the wheel G is limited by stop-pins or collars attached to said shaft, and its revolution is limited by the fans, or rather by the rods E attached to the said fans, and by the said stop-pins or collars attached to the said shaft, the wheel G moving spirally upon the said shaft. The fans or wings B are drawn inward by coiled springs H, which connect the said fans or wings in pairs or by equivalent springs or weights. By this construction, as the movement of the fans or wings B increases in rapidity the centrifugal force thus engendered moves the fans or wings outward, which turns the edges of said fans or wings toward the wind, thus checking their movement. As the velocity of the movement decreases, the springs H draw the fans or wings inward, which exposes more of their side surfaces to the wind, the fans or wings being thus self-regulating. The fans or wings may also be adjusted to regulate their movement, or to turn their edges toward the wind, and thus stop them, by moving the sliding wheel G by mechanical means.

Having thus described my invention, I claim as new, and desire to secure by Letters Patent—

The combination of the slide-rods C, stationary rods E, pivoted blocks or studs F, sliding wheel G, and springs H, or equivalent, with each other, and with the fans or wings B, and shaft A, substantially as herein shown and described, and for the purposes set forth.

ISAAC LEHMER.

Witnesses:
SAMUEL S. MAST,
LEVI PLANK.